BEST AVAILABLE COPY

J. C. WANDS.
Car-Roof.

No. 7,999. Reissued Dec. 18, 1877.

FIG. 1.

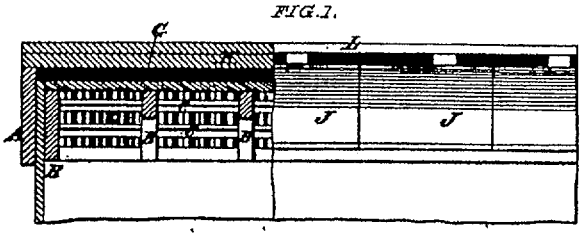

FIG. 5.

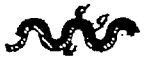

FIG. 4.

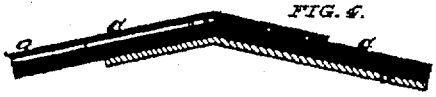

FIG. 2.

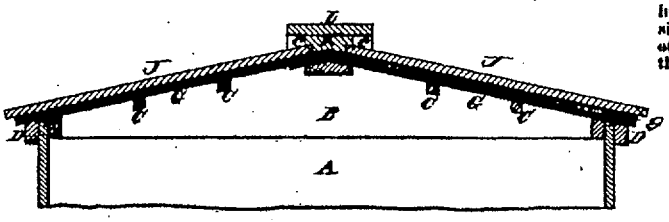

FIG. 3.

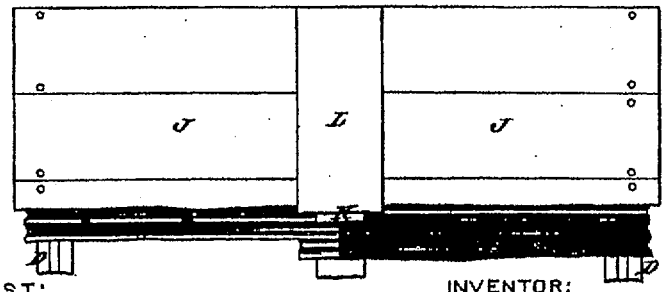

7,999. CAR-ROOFS. John C. Wands, Nashville
Patent No. 153,888, dated Aug. 4, 1874. Fi
23, 1877.

1. In combination with the sheathing-bo of a car-roof, the corrugated metallic lin imited by lapping and bending over the ri beam, so that the ridges of one lapped s shall fit into the grooves of the opposite sl and serve to brace and strengthen the substantially as specified.

2. A car-roof composed of a layer of bo and a lower layer of corrugated metallic sh the two layers, being in contact, affording tual support, and forming intermediate c nels for the water to pass off, and the co gated metal resting upon the top of the of the car, forming spaces between the wall and the metal, through which the air enter and leave the car, substantially as scribed.

3. A car-roof consisting of a layer of bo and a lower layer of corrugated metallic sh the latter being in contact with the bo above and resting upon the frame of the substantially as shown.

4. In combination with an upper layer sheathing-boards, the metallic lining, cons ing of sheets or plates that extend from eit side respectively, of the roof, over onto other side, lapping one upon the other ac the ridge, substantially as described.

ATTEST:
Geo. S. Boyd
Paul Bakewell

INVENTOR:
John C. Wands,
by Chas. D. Moody
Atty.

UNITED STATES PATENT OFFICE.

No 7999

BEST AVAILABLE COPY

*To all whom it may concern:*

Be it known that I, JOHN C. WANDS, of Nashville, in the county of Davidson and State of Tennessee, have invented a new and useful Improvement in Car-Roofs, of which the following is a full, clear, and exact description, reference being had to the annexed drawings, making a part of this specification, in which—

Figure 1 is a side elevation, partly in section, of a portion of a car-roof containing my improvement; Fig. 2, a transverse vertical section; Fig. 3, a plan, partly broken away, of a portion of the roof; Figs. 4 and 5, sectional views, showing the lapping of the metallic sheets.

Like letters refer to like parts.

This invention has relation to that class of car-roofs that are composed partly of wood and partly of metal, there being a lower layer of corrugated metallic sheets and an upper layer of sheathing-boards, the metallic sheets of both slopes of the roof extending, respectively, beyond the ridge of the roof and down upon the opposite slope, and lapping each other, as hereinafter more particularly described.

A very rigid and strong construction is obtained, the car is thoroughly ventilated, and water upon the roof is effectually directed therefrom.

In the annexed drawing, A designates the upper part of the body of a railway-car. B B represent the carlings or rafters, extending transversely across the top of the body, and ridged, as shown in Fig. 2. C C represent the purlins, extending from end to end of the car, and framed into the carlings, in the usual well-known manner. At the extremities of the carlings B B, and properly secured along the eaves of the roof, are the large boards D D. This constitutes the frame of the car, which may be constructed in the usual well-known manner. On this roof-frame I suitably secure sheets G G of corrugated metal, which may be zinc, galvanized iron, or other suitable metal. The corrugations *g g* are in a direction at right angles to the length of the car, as shown in the drawing. The sheets upon each slope of the roof respectively extend across and a short distance beyond the ridge of the roof, and are bent down upon the opposite slope. This causes the sheets upon the two slopes of a roof to lap and interlock at the ridge of the roof, as shown. Where the sheets G G lap, the valleys on one side receive the ridges on the other side, as seen in Figs. 2, 4, and 5. The sheets also lap laterally, as shown in Fig. 5.

The metal roof thus constructed is covered with boards J J, constituting a close sheathing, that protects the corrugated sheets from injury and wear, and destruction from exposure to wet and heat. The upper ends of the sheathing-boards abut against a roof-board clamp, K, and are received beneath shoulders *c c*, formed thereon, as shown in Fig. 2.

The wood planking or sheathing J is made of thin stuff, and is inexpensive. It can be readily replaced, and it serves as a shield or guard to the metallic corrugated portion of the roof.

On top of the roof-board clamp is secured the running-board L.

It will be seen from the above description that I form a sectional corrugated metallic roof, two sides of which interlock, imparting great strength to the car-body. Further, by means of the corrugations of the metallic portion of the roof, channels are formed between the sheets and sheathing for the escape of water, and at the same time openings over the large boards D D are formed for the circulation of air into and out of the car-body.

I am well aware that a car-roof has been composed partly of metal, and that a sheathing of wood is not new. I therefore do not claim such broadly. I am further aware that corrugated metal has been used for roofing purposes.

I claim—

1. In combination with the sheathing-boards of a car-roof, the corrugated metallic lining, united by lapping and bending over the ridge-beam, so that the ridges of one lapped sheet shall fit into the grooves of the opposite sheet, and serve to brace and strengthen the roof, substantially as specified.

2. A car-roof composed of a layer of boards and a lower layer of corrugated metallic sheets, the two layers, being in contact, affording mutual support, and forming intermediate channels for the water to pass off, and the corrugated metal resting upon the top of the wall of the car, forming spaces between the car-wall and the metal, through which the air can enter and leave the car, substantially as described.

3. A car-roof consisting of a layer of boards and a lower layer of corrugated metallic sheets, the latter being in contact with the boards above and resting upon the frame of the car, substantially as shown.

4. In combination with an upper layer of sheathing-boards, the metallic lining, consisting of sheets or plates that extend from either side respectively, of the roof, over onto the other side, lapping one upon the other across the ridge, substantially as described.

JOHN C. WANDS.

Witnesses:
A. R. BROWN,
G. W. DONIGAN.